United States Patent
Okumura et al.

(10) Patent No.: US 10,659,171 B2
(45) Date of Patent: May 19, 2020

(54) COMMUNICATION DEVICE, ELECTRONIC TIMEPIECE, COMMUNICATION METHOD AND RECORDING MEDIUM

(71) Applicant: CASIO COMPUTER CO., LTD., Shibuya-ku, Tokyo (JP)

(72) Inventors: Ryo Okumura, Hamura (JP); Takahiro Tomida, Hamura (JP); Tsutomu Terazaki, Hamura (JP); Toshihiro Takahashi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 155 days.

(21) Appl. No.: 15/272,492

(22) Filed: Sep. 22, 2016

(65) Prior Publication Data
US 2017/0134102 A1    May 11, 2017

(30) Foreign Application Priority Data
Nov. 5, 2015    (JP) .................... 2015-217264

(51) Int. Cl.
*H04J 3/24* (2006.01)
*H04B 13/00* (2006.01)
*H04W 4/80* (2018.01)
*H04L 29/06* (2006.01)
*H04L 29/12* (2006.01)
*G04R 20/18* (2013.01)
(Continued)

(52) U.S. Cl.
CPC ........... *H04B 13/005* (2013.01); *G04R 20/18* (2013.01); *H04L 5/0055* (2013.01); *H04L 61/2092* (2013.01); *H04L 63/0421* (2013.01); *H04L 63/162* (2013.01); *H04L 69/22* (2013.01); *H04W 4/80* (2018.02); *H04L 61/2038* (2013.01); *H04L 61/6022* (2013.01); *H04W 84/12* (2013.01)

(58) Field of Classification Search
None
See application file for complete search history.

(56) References Cited

U.S. PATENT DOCUMENTS

| 2007/0019609 | A1  | 1/2007 | Anjum  |             |
|--------------|-----|--------|--------|-------------|
| 2011/0134842 | A1* | 6/2011 | Ho     | A61N 1/37252 370/328 |
| 2014/0112315 | A1* | 4/2014 | Yokoo  | H04L 5/0094 370/336 |

FOREIGN PATENT DOCUMENTS

JP        2010-273115        12/2010

OTHER PUBLICATIONS

IEEE Part 15.3: Wireless Body Area Networks, 2012, all pages (Year: 2012).*

(Continued)

*Primary Examiner* — Brandon M Renner
(74) *Attorney, Agent, or Firm* — Amin, Turocy & Watson, LLP

(57) ABSTRACT

According to an aspect of the present invention, a communication device includes a communicator for communication with other device in a network to which the communication device belongs and a processor for generating frames to be communicated. The processor generates second identification information different from first identification information which is identification information unique to the communication device based on the first identification information. Further, the processor generates a frame including the second identification information.

4 Claims, 14 Drawing Sheets

(51) Int. Cl.
*H04L 5/00* (2006.01)
*H04W 84/12* (2009.01)

(56) References Cited

OTHER PUBLICATIONS

Extended European Search Report for European Patent Application No. 16193962.4 dated Mar. 28, 2017.
Demir, et al. "Analysing the Privacy Policies of Wi-Fi Trackers", Jun. 11, 2014.

* cited by examiner

Substitute address=f(real address)

Here, f is irreversible transformation function.

Substitute address=f(real address, identification information of BAN)

Here, f is irreversible transformation function.

COMMUNICATION DEVICE, ELECTRONIC TIMEPIECE, COMMUNICATION METHOD AND RECORDING MEDIUM

CROSS-REFERENCE TO RELATED APPLICATIONS

This application is based upon and claims the benefit of priority under 35 USC 119 of Japanese Patent Application No. 2015-217264 filed on Nov. 5, 2015, the entire disclosure of which is incorporated herein by reference in its entirety for all purposes.

BACKGROUND OF THE INVENTION

1. Field of the Invention

The present invention relates to a communication device, a communication method, and a computer readable recording medium for recording a program for executing the communication method.

2. Description of the Related Art

Conventionally, many research studies have been done on application of the information communication technology to fields where devices disposed in close vicinity to a human body are used, such as health and medical care. The institute of electrical and electronics engineers (IEEE) 802 LAN/MAN Standards Committee proposed the 802.15.6 standard protocol for the purpose of low-power local area wireless communication for Body Area Network (BAN) applications.

The IEEE 802.15.6 protocol defines a physical (PHY) layer and a medium access control (MAC) sublayer for the wireless BAN (also referred to as WBAN) operating in-body, on-body, or off-body. Here, the "body" is not limited to the human body and includes bodies of animals and organisms having propagation environment similar to the human body.

According to the IEEE 802.15.6 protocol, a device belonging to a BAN serves as a hub or a node. When communication between a hub and a node is performed, the node transmits a MAC frame containing its address to the hub. Since the BAN was proposed for data communication between devices close to the human body, protection of personal information and security of data are very important. As an example of a technology for realizing stable and high-secrecy communication, Japanese Patent Application Laid-Open Publication No. 2010-273115 published on Dec. 2, 2010, discloses transmitting an encryption key from a first node to a second node by ultrasonic wave communication using a living body as a propagation path and transmitting data encrypted using the received encryption key from the second node to the first node by electromagnetic wave communication using the air as a propagation path.

SUMMARY OF THE INVENTION

Conventionally, in order for two devices to communicate with each other in a BAN, any one of the devices is required to inform the other device of its address which is unique identification information of the device. However, for example, in the case that the node temporarily participates in the BAN or just wants to acquire information of low importance from the hub, it is desirable to conceal information relating to the node from the hub as much as possible.

An object of the present invention is to provide a device, a method, a computer readable recording medium for recording a program, and an electronic timepiece for generating or processing frames to enable data communication while preserving anonymity of one party from the other party.

According to one aspect of the invention, a device for communication according to a specific communication protocol defining frames of communication data includes a processor for generating frames. The processor generates second identification information different from first identification information which is identification information unique to the device based on the first identification information. Further, the processor generates a frame including the second identification information.

According to one aspect of the invention, a device for communication according to a specific communication protocol defining frames of communication data includes a processor for analyzing and generating frames. The processor acquires first identification information which is information for identifying other device from a frame received from the other device. The processor determines whether or not frame data including specific discrimination information is stored and generates second identification information different from the first identification information based on the first identification information in the case that frame data including the specific discrimination information is stored. Further, the processor acquires device identification information from the frame data including the specific discrimination information, compares the acquired device identification information and the second identification information, and generates a frame including the first identification information in the case that they are the same.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention. Here.

DETAILED DESCRIPTION OF THE PREFERRED EMBODIMENT

In the present specification, the invention will be mainly described in connection with embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark).

Hereinafter, embodiments of the present invention will be described with reference to the accompanying drawings. The scope of the invention is not intended to be limited to the illustrated examples.

Figure 1:
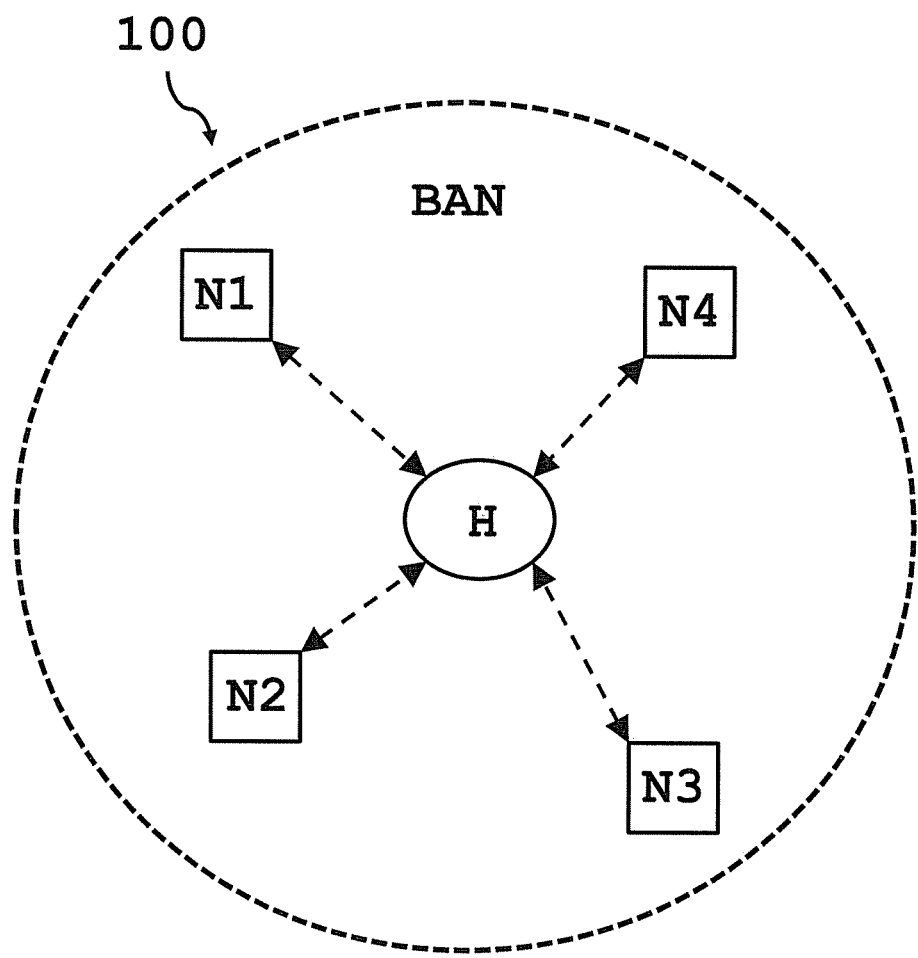
FIG. 1 is a diagram showing a topology of a body area network (BAN).

FIG. 1 is a diagram showing a topology of the body area network (BAN). A BAN 100 includes a device, which plays the role of a hub H, and one or more devices each of which plays the role of a node N. There is to be one and only one hub in a BAN, whereas the number of nodes in the BAN is to range from zero to the maximum number of nodes connectable to the hub (mMaxBANSize). In the example shown in FIG. 1, four nodes N1 to N4 belong to the BAN 10, but the number of nodes is not limited to this example. The hub H is a mobile terminal such as a smart phone or a personal digital assistant (PDA), or an electronic timepiece provided with a communication function, for example. The node N is a bio-signal measuring device, a bio-signal monitoring device or a sensor for measuring/receiving bio-signals and transmitting to the hub H, or an electronic timepiece including one or more of them, for example.

Figure 2:
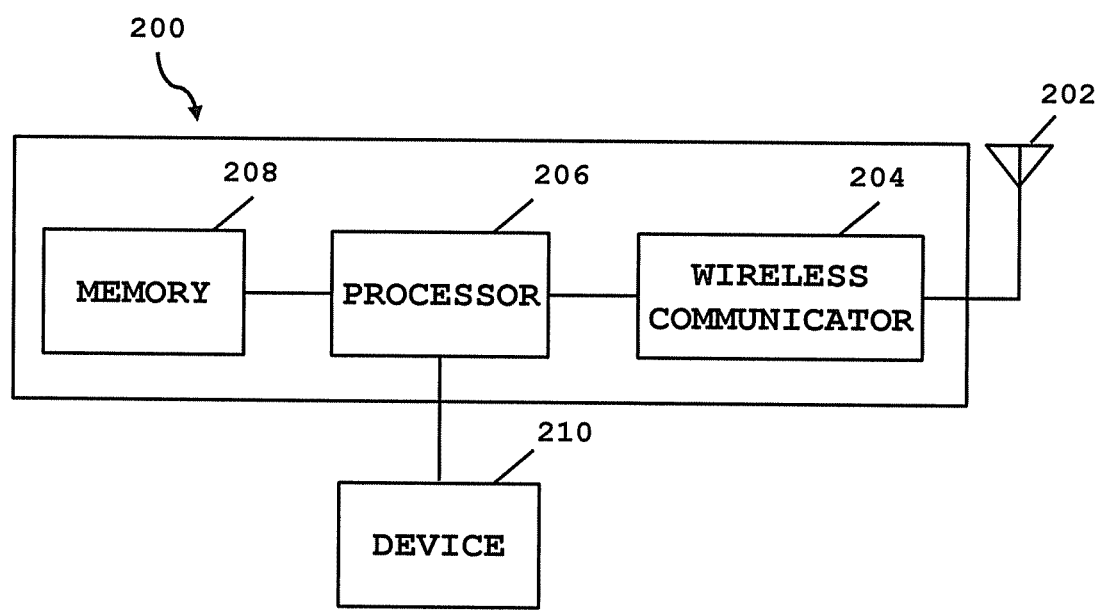
FIG. 2 is a block diagram showing a hardware configuration of a communication device which can be used as a hub or a node in a BAN according to an embodiment of the invention.

FIG. 2 is a block diagram showing a hardware configuration of a communication device which can be used as a hub H or a node N in the BAN according to an embodiment of the invention. In an embodiment of the invention, a communication device 200 is a hub, a gateway, or a controller for communicating with one or more nodes and controlling them. In an embodiment of the invention, the device 200 is a low-power wireless node operating in, on, or around the body (not limited to the human body) for one or more applications such as a medical device, an electronic appliance, or a personal amusement device.

A processor 206 processes messages exchanged via an antenna 202 and a wireless communicator (or, a transceiver) 204 and/or via a wireline connected to the internet or a different body area network (not shown in the drawings). The antenna 202 transmits and receives electromagnetic waves of a frequency corresponding to a wireless communication method adopted by the processor 206. The wireless communicator 204 includes a circuit for transforming an electric signal input from the processor 206 into an electromagnetic wave or transforming a received electromagnetic wave into an electric signal to output it to the processor 206. These electric signals are transmitted and received on a frame-by-frame basis. The processor 206 performs functions of generating and transmitting frames, and receiving frames from other communication device(s) and processing them. The processor 206 may include software, firmware, hardware, or a combination thereof.

A memory 208 can be used to store data such as frame structure information, medium access control information, and power management information, as well as data of frames transmitted or received (hereinafter, referred to as "frame data"). Further, the memory 208 may also be used to store computer program instructions, software and/or firmware executed by the processor 206. The memory 208 may be any storage device such as a RAM (Random Access Memory), a ROM (Read Only Memory), a flash memory, or a disk drive integrated into or removable from the communication device 200. Alternatively, the memory 208 may be any storage device integrated into or removable from the processor 206.

The communication device 200 can be connected to other device(s) such as a device 210. The device 210 is a sensor (now shown in the drawings) used to monitor data from the body such as body temperature, respiration, heart rate, or blood sugar, or a device for providing a function of controlling a pace maker, a respirator, an insulin pump, or the like, for example.

The network 100 shown in FIG. 1 and the communication device 200 shown in FIG. 2 are merely examples and do not limit the scope of systems or devices capable of implementing communication processes described herein. Any devices connected wired or wirelessly capable of performing one or more of communication processes according to the present invention fall within the scope of the invention.

Figure 3:
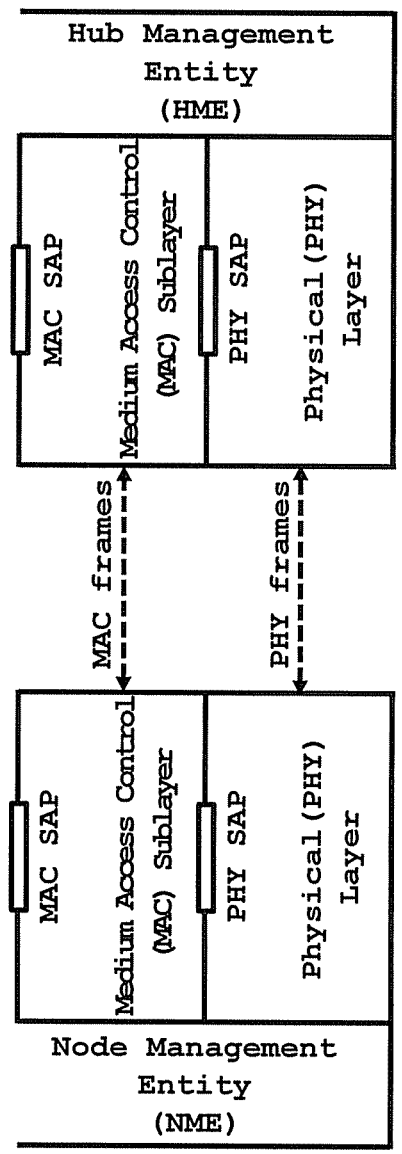
FIG. 3 is a diagram showing a physical (PHY) layer and a medium access control (MAC) sublayer in a hub or a node.

A hub or a node such as the communication device 200 is internally partitioned into a physical (PHY) layer and a medium access control (MAC) sublayer. FIG. 3 is a diagram showing the PHY layer and the MAC sublayer according to the ISO/OSI-IEEE 802 reference model. Direct communications between the node and the hub are to transpire at the PHY layer and the MAC sublayer. In the present embodiment, the PHY layer and the MAC sublayer of the node or the hub are to use only one operating channel at any given time. However, the present invention is not limited thereto.

Within the node or the hub, the MAC provides its service to the MAC client (higher layer) through the MAC service access point (SAP) located immediately above the MAC sublayer, while the PHY provides its service to the MAC through the PHY SAP located between them. On transmission, the MAC client passes MAC service data units (MSDUs) to the MAC sublayer via the MAC SAP, and the MAC sublayer passes MAC frames (also known as MAC protocol data units or MSDUs) to the PHY layer via the PHY SAP. On reception, the PHY layer passes MAC frames to the MAC sublayer via the PHY SAP, and the MAC sublayer passes MSDUs to the MAC client via the MAC SAP.

Figure 4:
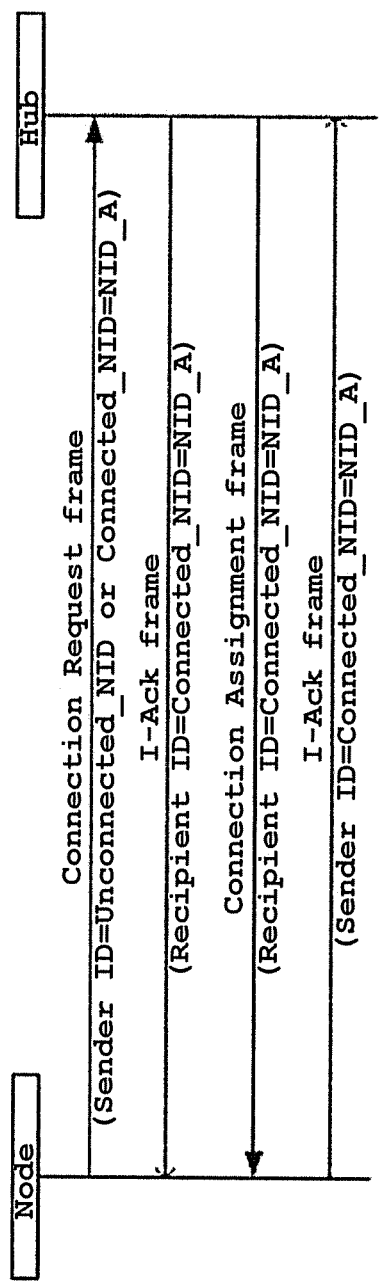
FIG. 4 shows a connection procedure between a node and a hub.

FIG. 4 shows a connection procedure between a node and a hub. As shown in FIG. 4, a node unconnected to a hub acquires, from a beacon frame sent from the hub, a network ID which is identification information unique to a network of the hub (a BAN ID, in the present embodiment) and the hub's address. The node generates a Connection Request frame based on the acquired information and transmits it to the hub. The Connection Request frame is a frame transmitted by the node to request creation or modification of a connection with the hub. If the hub receives the Connection Request frame from the node, the hub transmits to the node an I-Ack (Immediate Acknowledgement) frame for acknowledging successful receipt of the Connection Request frame. Then, the hub generates a Connection Assignment frame and transmits it to the node. The Connection Assignment frame is a frame transmitted by the hub to respond to a connection request or to initiate or change a connection assignment. If the node receives the Connection Assignment frame from the hub, the node transmits an I-Ack frame to the hub. By this, the node and the hub are connected and become to be able to communicate necessary information (data) with each other.

In the following, a MAC frame structure of each of a beacon frame, a Connection Request frame, and a Connection Assignment frame used for BAN communication will be described in detail.

Figure 5A:
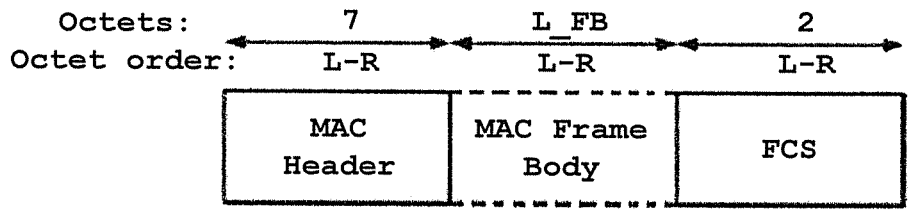
FIG. 5A shows a format of a MAC frame.

A format of a MAC frame according to the present embodiment is shown in FIG. 5A. The MAC frame includes a fixed-length MAC header, a variable-length MAC frame body, and a fixed length Frame Check Sequence (FCS) field. The MAC Frame is a sequence of fields delivered to or from the PHY SAP. The fields contained in the MAC frame will be defined in the following. Each of the figures explained below depicts the fields contained in the MAC frame from left to right in the transmit order, with fields that are optional or selectively absent drawn in dashes. Also indicated is the number of octets contained in each field along with the corresponding octet transmit order, on top of the field. Reserved fields are set to zero on transmission and ignored on reception.

Figure 5B:
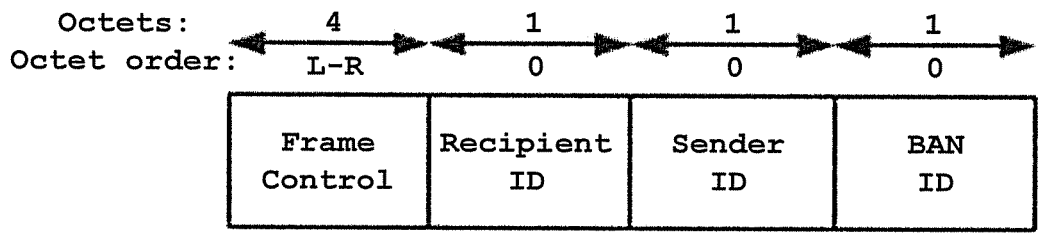
FIG. 5B shows a format of a MAC header.

FIG. 5B shows a format of the MAC header according to the present embodiment. The MAC header includes Frame Control, Recipient ID, Sender ID, and BAN ID fields. The Frame Control will be described in the following. The Recipient ID field is set to the abbreviated address (i.e., NID (Node Identifier) or HID (Hub Identifier)) of the recipient of the current frame. The Sender ID field is set to the abbreviated address (i.e., NID or HID) of the sender of the current frame. The BAN ID field is set to the abbreviated address of the BAN in which the current frame is transferred.

Figure 5C:
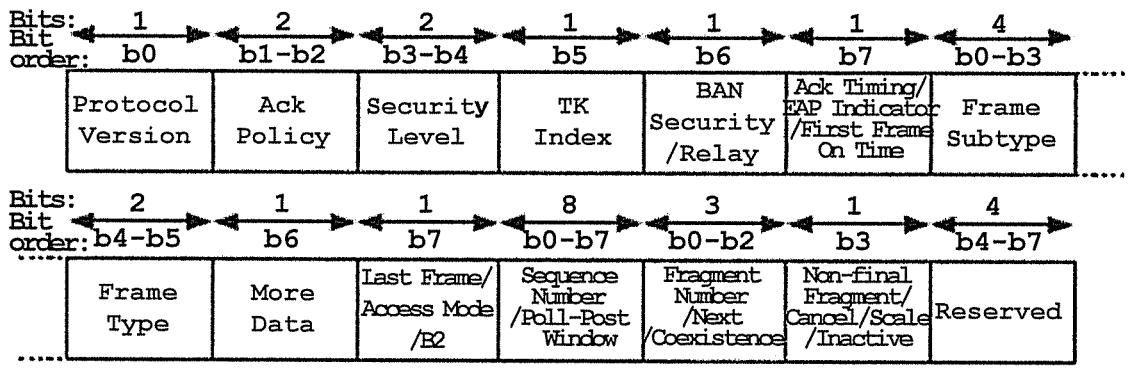
FIG. 5C shows a format of a Frame Control field.

A format of the Frame Control according to the present embodiment is shown in FIG. 5C. Each field of the Frame Control is defined in Section 5.2.1.1 of IEEE Std 802.15.6-2012. Frame Subtype and Frame Type fields of the Frame Control are set to indicate the type of the current frame according to Table 1 below.

TABLE 1

Frame Type and Frame Subtype field encoding

| Frame Type value b5b4 | Frame Type name | Frame Subtype value b3b2b1b0 | Frame Subtype name |
|---|---|---|---|
| 00 | Management | 0000 | Beacon |
| 00 | Management | 0001 | Reserved |
| 00 | Management | 0010 | Security Association |
| 00 | Management | 0011 | Security Disassociation |
| 00 | Management | 0100 | PTK |
| 00 | Management | 0101 | GTK |
| 00 | Management | 0110-0111 | Reserved |
| 00 | Management | 1000 | Connection Request |
| 00 | Management | 1001 | Connection Assignment |
| 00 | Management | 1010 | Disconnection |

TABLE 1-continued

Frame Type and Frame Subtype field encoding

| Frame Type value b5b4 | Frame Type name | Frame Subtype value b3b2b1b0 | Frame Subtype name |
|---|---|---|---|
| 00 | Management | 1011-1110 | Reserved |
| 00 | Management | 1111 | Command |
| 01 | Control | 0000 | I-Ack |
| 01 | Control | 0001 | B-Ack |
| 01 | Control | 0010-0011 | Reserved |
| 01 | Control | 0100 | I-Ack + Poll |
| 01 | Control | 0101 | B-Ack + Poll |
| 01 | Control | 0110 | Poll |
| 01 | Control | 0111 | T-Poll |
| 01 | Control | 1000-1101 | Reserved |
| 01 | Control | 1110 | Wakeup |
| 01 | Control | 1111 | B2 |
| 10 | Data | 0000 | User Priority 0 or Allocation Mapped Data Subtype |
| 10 | Data | 0001 | User Priority 1 or Allocation Mapped Data Subtype |
| 10 | Data | 0010 | User Priority 2 or Allocation Mapped Data Subtype |
| 10 | Data | 0011 | User Priority 3 or Allocation Mapped Data Subtype |
| 10 | Data | 0100 | User Priority 4 or Allocation Mapped Data Subtype |
| 10 | Data | 0101 | User Priority 5 or Allocation Mapped Data Subtype |
| 10 | Data | 0110 | User Priority 6 or Allocation Mapped Data Subtype |
| 10 | Data | 0111 | Emergency |
| 10 | Data | 1000-1111 | Allocation Mapped Data Subtype |
| 11 | Reserved | 0000-1111 | Reserved |

As shown in Table 1, the value of the Frame Type indicates the type of the current frame. More specifically, in the case that the value of the Frame Type is 00, the current frame is a Management frame. In the case that the value of the Frame Type is 01, the current frame is a Control frame. In the case that the value of the Frame Type is 10, the current frame is a Data frame. In the case that the value of the Frame Type is 11, the current frame is a Reserved frame. The value of the Frame Subtype is set according to the subtype of the current frame. Thus, the combination of the Frame Type value and the Frame Subtype value indicates the kind of the current frame. For example, in the case that the Frame Type value is 00 and the Frame Subtype value is 0000, the current frame is a beacon frame. In the case that the Frame Type value is 00 and the Frame Subtype value is 1000, the current frame is a Connection Request frame. In the case that the Frame Type value is 00 and the Frame Subtype value is 1001, the current frame is a Connection Assignment frame. In the case that the Frame Type value is 01 and the Frame Subtype value is 0000, the current frame is an I-Ack frame.

Figure 5D:
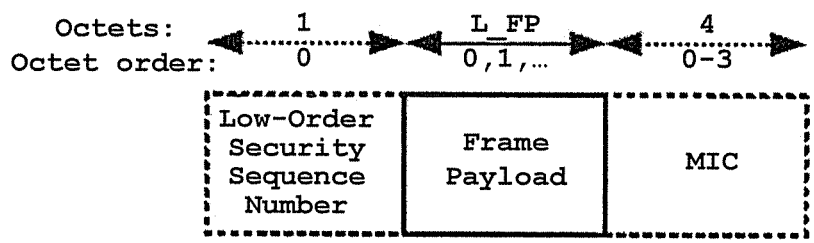
FIG. 5D shows a format of a MAC frame body.

FIG. 5D shows a format of the MAC frame body according to the present embodiment. Low-Order Security Sequence Number and Message Integrity Code (MIC) fields are not present in unsecured frames, as indicated by the Security Level field of the Frame Control field of the MAC header of the current frame. Frame Payload is a sequence of fields to be communicated to the recipient(s). An I-Ack frame transmitted by a node to a hub contains no Frame Payload. An I-Ack frame transmitted by a hub to a node selectively contains a Frame Payload.

Figure 6A:
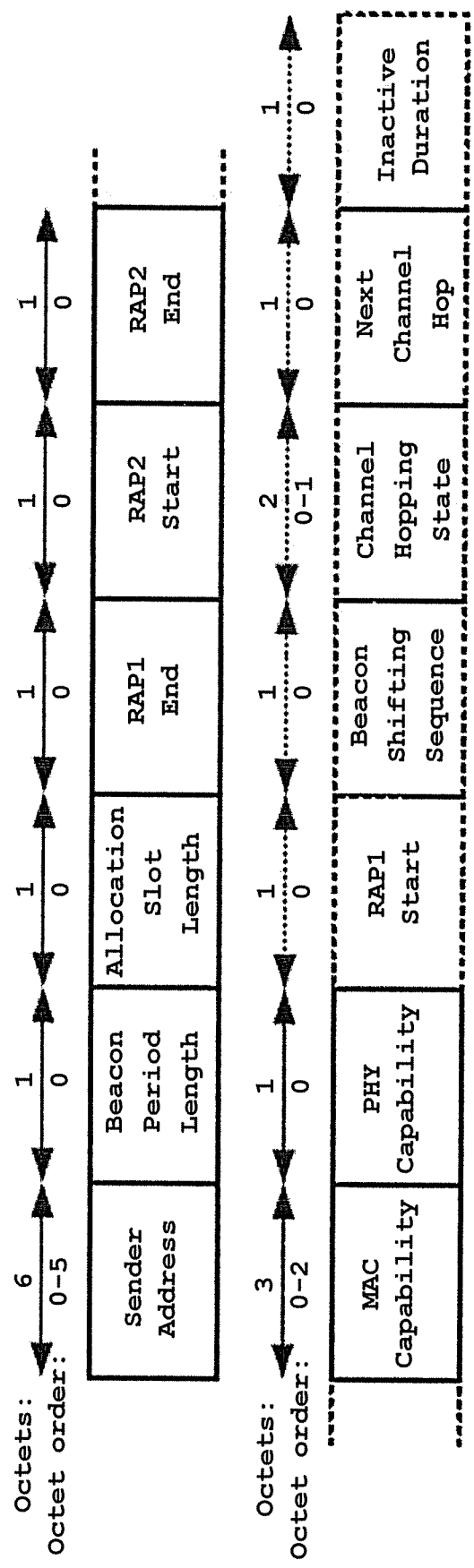
FIG. 6A shows a format of a frame payload of a beacon frame.

A beacon frame according to the present embodiment contains a frame payload that is formatted as shown in FIG. 6A. The beacon frame is transmitted by a hub in each beacon period (also referred to as a "superframe") by the hub to let nodes know existence of the network of the hub and make the nodes participate in the network. The Sender Address field is set to the EUI-48 (EUI: Extended Unique Identifier) of the hub sending the current beacon. Each of other fields of the frame payload of the beacon frame is defined in Section 5.3.1 of IEEE Std 802.15.6-2012.

Figure 6B:
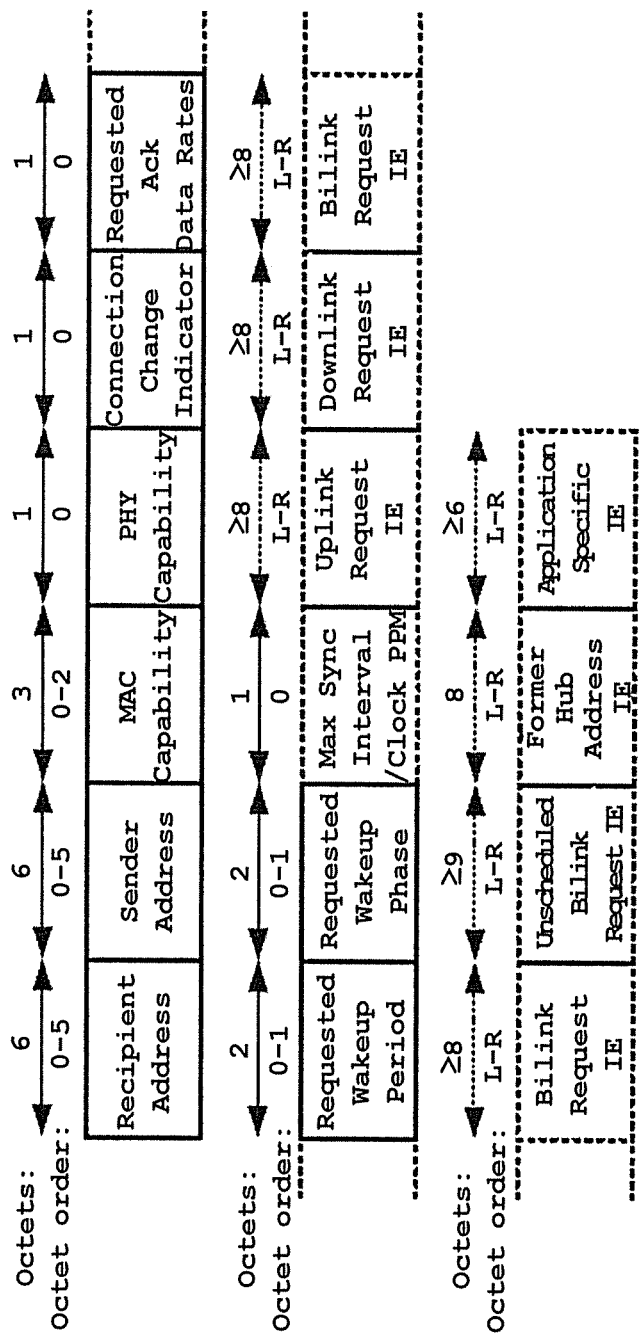
FIG. 6B shows a format of a frame payload of a Connection Request frame.

A Connection Request frame according to the present embodiment contains a frame payload that is formatted as shown in FIG. 6B. The Recipient Address field is set to the EUI-48 of the recipient of the current frame, or is set to zero if such an EUI-48 is yet unknown. The Sender Address field is set to the EUI-48 of the sender of the current frame. Each of other fields of the frame payload of the Connection Request frame is defined in Section 5.3.6 of IEEE Std 802.15.6-2012.

Figure 6C:
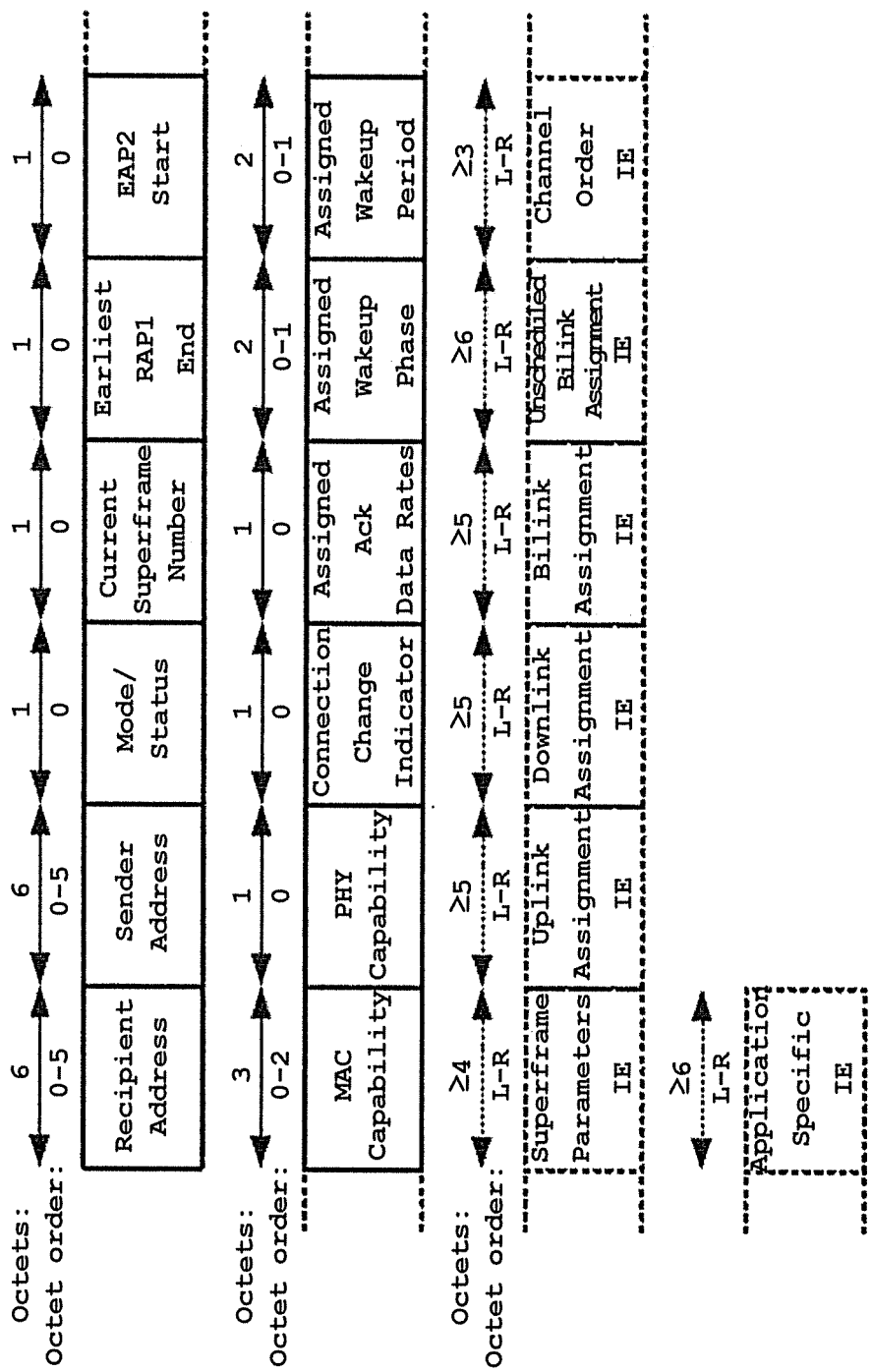
FIG. 6C shows a format of a frame payload of a Connection Assignment frame.

A Connection Assignment frame according to the present embodiment includes a frame payload that is formatted as shown in FIG. 6C. The Recipient Address field is set to the EUI-48 of the recipient of the current frame. The Sender Address field is set to the EUI-48 of the sender of the current frame. Each of other fields included in the frame payload of the Connection Assignment frame is defined in Section 5.3.7 of IEEE Std 802.15.6-2012.

In the following, anonymous communication processes according to embodiments of the invention will be described. First, a conventional, non-anonymous communication process is described with reference to FIG. 7. If the communication process starts, an unconnected node N generates a Connection Request frame containing a frame payload as shown in FIG. 6B and transmits it to a hub H (Step S702). The Recipient Address field of the Connection Request frame is set to the EUI-48 of the hub H which is the recipient of the frame. The Sender Address field of the Connection Request frame is set to the EUI-48 of the node N. If the hub H receives the Connection Request frame, the hub H transmits an I-Ack frame to the node N (Step S704). The I-Ack frame is described in detail in Section 5.4.1 of IEEE Std 802.15.6-2012.

Then, the hub H generates a Connection Assignment frame containing a frame payload as shown in FIG. 6C and transmits it to the node N (Step S706). The Recipient Address field of the Connection Assignment frame is set to the EUI-48 of the node N which is the recipient of the frame. The Sender Address field of the Connection Assignment frame is set to the EUI-48 of the hub H. If the node N receives the Connection Assignment, the node N transmits an I-Ack frame to the hub H (Step S708). In the case that a connection is established between the hub H and the node N by the procedure described above, the hub H and the node N communicate information (data) with each other until the connection is released (Step S710).

Figure 8A:
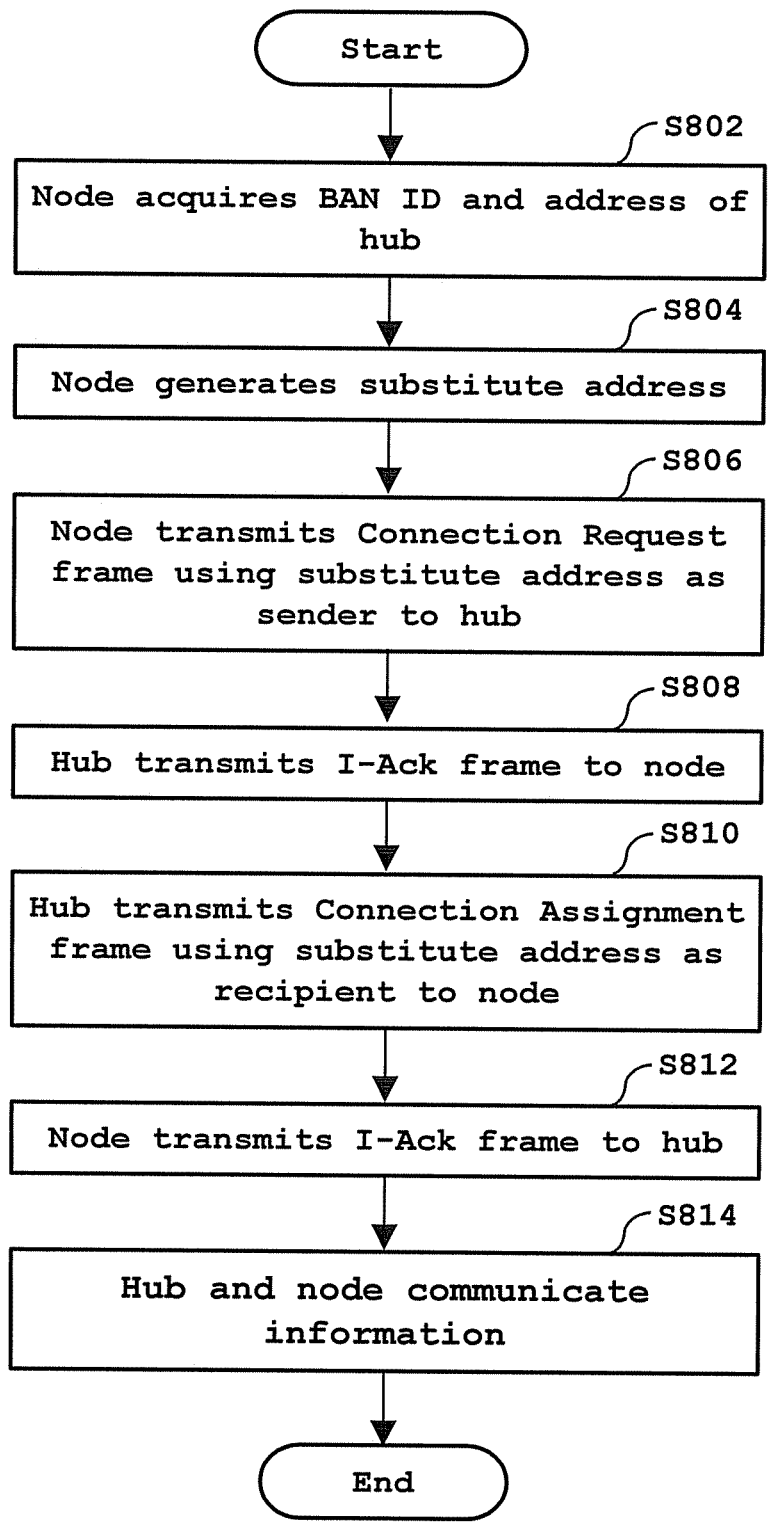
FIG. 8A is a flow chart showing an anonymous communication process according to an embodiment of the invention.

Next, an anonymous communication process according to an embodiment of the invention is shown in FIG. 8A. If the communication process starts, a node N unconnected to a hub H receives a beacon frame sent from the hub H and acquires the BAN ID of a BAN of the hub H and the address of the hub H from the beacon frame (Step S802). The BAN ID can be acquired from the BAN ID field of the header of the beacon frame. The address of the hub H can be acquired from the Sender Address field of the payload of the beacon frame.

Figure 9A:
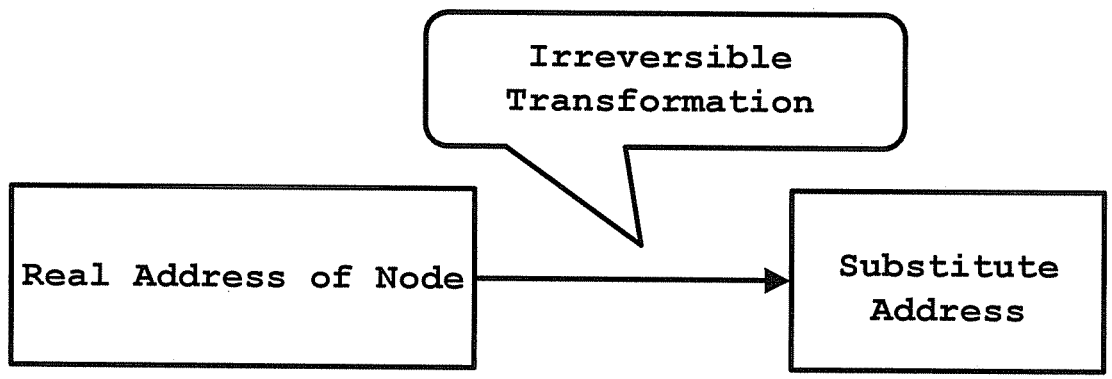
FIG. 9A shows a method for generating a substitute address according to an embodiment of the invention.

The node N generates a substitute address (or, a temporary address) which substitutes for its real address (Step S804). FIG. 9A shows a method for generating the substitute address of the node N according to an embodiment of the invention. In the present embodiment, the substitute address is generated using the address of the node N as a parameter of a specific function. More desirably, the function is an irreversible transformation function and the substitute address is generated by irreversibly transforming the address of the node N. For example, one of cryptographic hash functions such as MD5 (Message-Digest algorithm 5) and SHA (Secure Hash Algorithm) can be used as the irreversible transformation function. The specific examples of the irreversible transformation function do not constitute the fundamental idea of the invention.

Figure 9B:
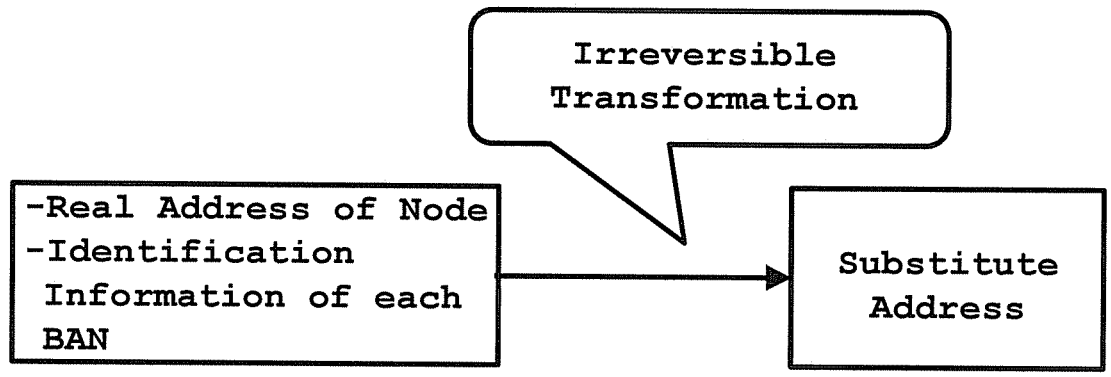
FIG. 9B shows a method for generating a substitute address according to another embodiment of the invention.

FIG. 9B shows a method for generating a substitute address of the node N according to another embodiment of the invention. In the present embodiment, the node N generates the substitute address by using identification information of the network in which the node wants to participate (for example, the BAN ID acquired from the beacon frame) as well as its address as parameters of a specific function, as shown in the drawing. It is also desirable to use one of the irreversible transformation functions such as MD5 and SHA as the function. The embodiments do not limit methods for generating the substitute address of the present invention. For example, the irreversible transformation may be performed by irreversible mapping.

Again referring to FIG. 8A, the node N transmits to the hub H a Connection Request frame using the substitute address generated at Step S804 as the sender of the frame (Step S806). In other words, the Sender Address field of the Connection Request frame is set to the substitute address.

If the hub H receives the Connection Request frame successfully, the hub H transmits an I-Ack frame to the node N to acknowledge the successful receipt (Step S808). Then, the hub H transmits to the node N a Connection Assignment frame in which the recipient address is set to the substitute address (Step S810).

If the node N receives the Connection Assignment frame successfully, the node N transmits an I-Ack frame to the hub H to acknowledge the successful receipt (Step S812). In another embodiment, the anonymous communication process does not include transmitting the I-Ack frame at Step S808 and/or Step S812.

In the case that a connection is established between the hub H and the node N by the procedure described above, the hub H and the node N communicate information (data) with each other until the connection is released (Step S814).

Figure 8B:
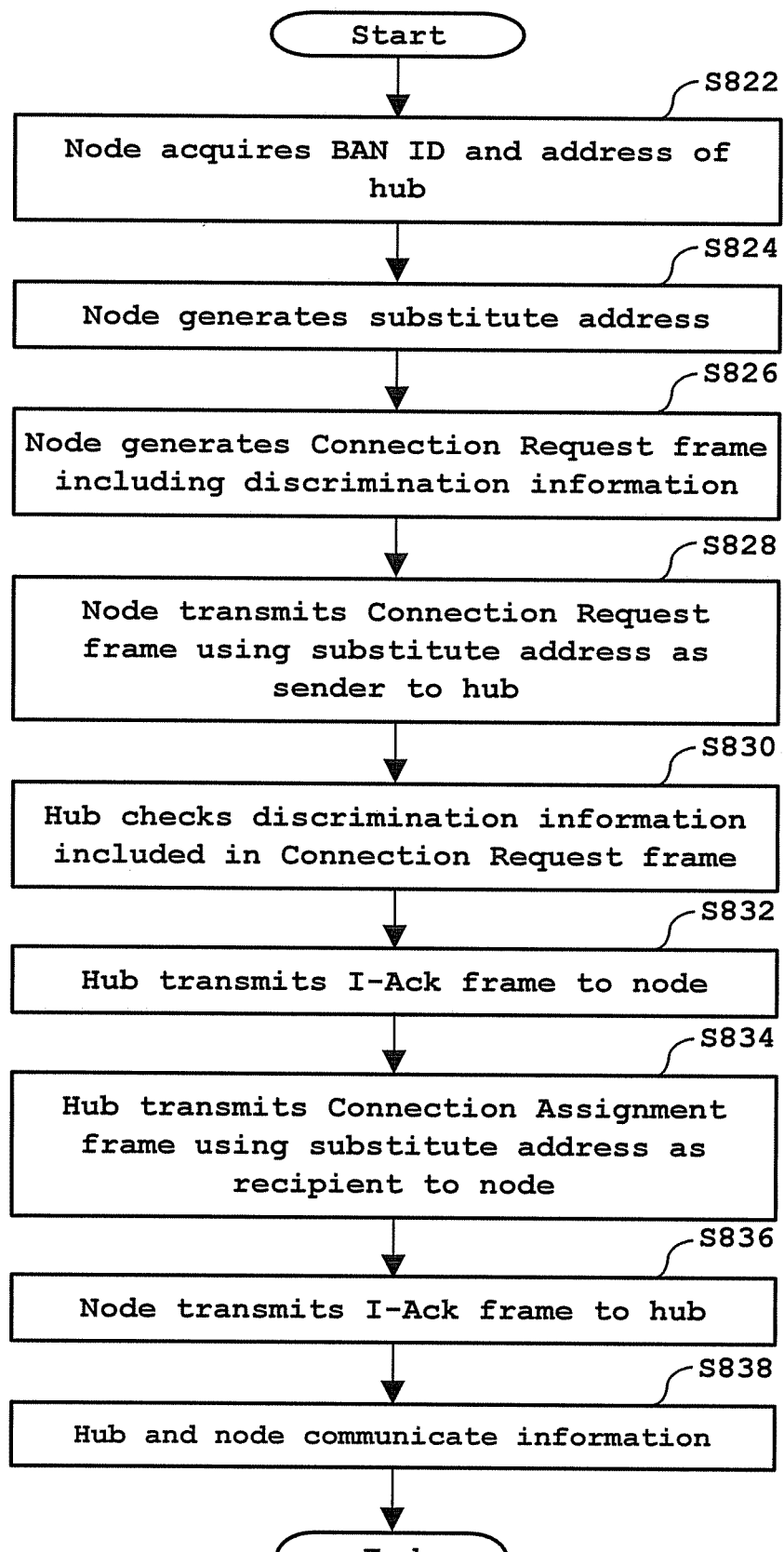
FIG. 8B is a flow chart showing an anonymous communication process according to another embodiment of the invention.

FIG. 8B shows an anonymous communication process according to another embodiment of the invention. In the present embodiment, the node N notifies the hub H that it will communicate using not its real address but a substitute address. If the communication process starts, a node N unconnected to a hub H receives a beacon frame sent from the hub H and acquires the BAN ID of a BAN of the hub H and the address of the hub H from the beacon frame, similarly to Step S802 of the embodiment shown in FIG. 8A (Step S822). The node N generates the substitute address (or, a temporary address) which substitutes for its real address, similarly to Step S804 of the embodiment shown in FIG. 8A (Step S824). The substitute address can be generated by using one of the methods described with respect to the embodiment shown in FIG. 8A referring to FIGS. 9A and 9B.

Then, the node N generates a Connection Request frame including discrimination information for notifying the hub H that the node N will communicate using not its real address but the substitute address (Step S826). In other words, the discrimination information (or, a flag) is included in the Connection Request frame to discriminate the current frame from the conventional Connection Request frame. The discrimination information is contained in the Security Level field of the Frame Control field of the MAC header of the Connection Request frame (see FIGS. 5B and 5C), for example. As defined in Section 5.2.1.1.3 of IEEE Std 802.15.6-2012 (see Table 2 below), the Security Level field is set such that it indicates the security level of the current frame. As shown in Table 2, the value of 0b11 is not used in the IEEE 802.15.6 Specification. In the present embodiment, the Security Level field of the Frame Control field of the MAC header of the Connection Request frame is set to 0b11 as a method for including the discrimination information in the Connection Request frame.

TABLE 2

Security Level field encoding

| Field value b4b3 | Security level of current frame |
|---|---|
| 00 | Level 0-frame not secured |
| 01 | Level 1-frame authenticated but not encrypted |
| 10 | Level 2-frame authenticated and encrypted |
| 11 | Reserved |

The present invention is not limited to the above embodiment. In other embodiments, a field other than the Security Level field can be used to contain the discrimination information. For example, the discrimination information can be contained in one bit of four bits, which are reserved, of the Frame Control field of the MAC header of the Connection Request frame. The value of the one bit can be set to zero (0) in the case of performing the conventional non-anonymous communication and to one (1) in the case of performing the anonymous communication (i.e. using the substitute address). In other embodiments, the Frame Type field or the Frame Subtype field which is reserved (see Table 1) of the MAC header is used. The values of the Frame Type field and the Frame Subtype field which can be used as the discrimination information are listed in Table 3.

TABLE 3

Frame Type and Frame Subtype values

| Frame Type value | Frame Type name | Frame Subtype value |
|---|---|---|
| 00 | Management | 0001 |
| 00 | Management | 0110-0111 |
| 00 | Management | 1011-1110 |
| 01 | Control | 0010-0011 |
| 01 | Control | 1000-1101 |
| 11 | Reserved | 0000-1111 |

In another embodiment, in the case that the node N lets the hub H know that the node N will communicate with the hub H anonymously when it transmits the Connection Request frame, and, after that, the hub H remembers that communication with the node N is performed through the anonymous communication process, the discrimination information does not necessarily have to be stored in the MAC header. In other words, the discrimination information may be stored in the payload of the Connection Request frame.

The node N transmits a Connection Request frame indicating the substitute address generated at Step S824 as the sender of the frame and containing the discrimination information to the hub H (Step S828). In other words, the Sender Address field of the Connection Request frame is set to the substitute address.

Figure 7:
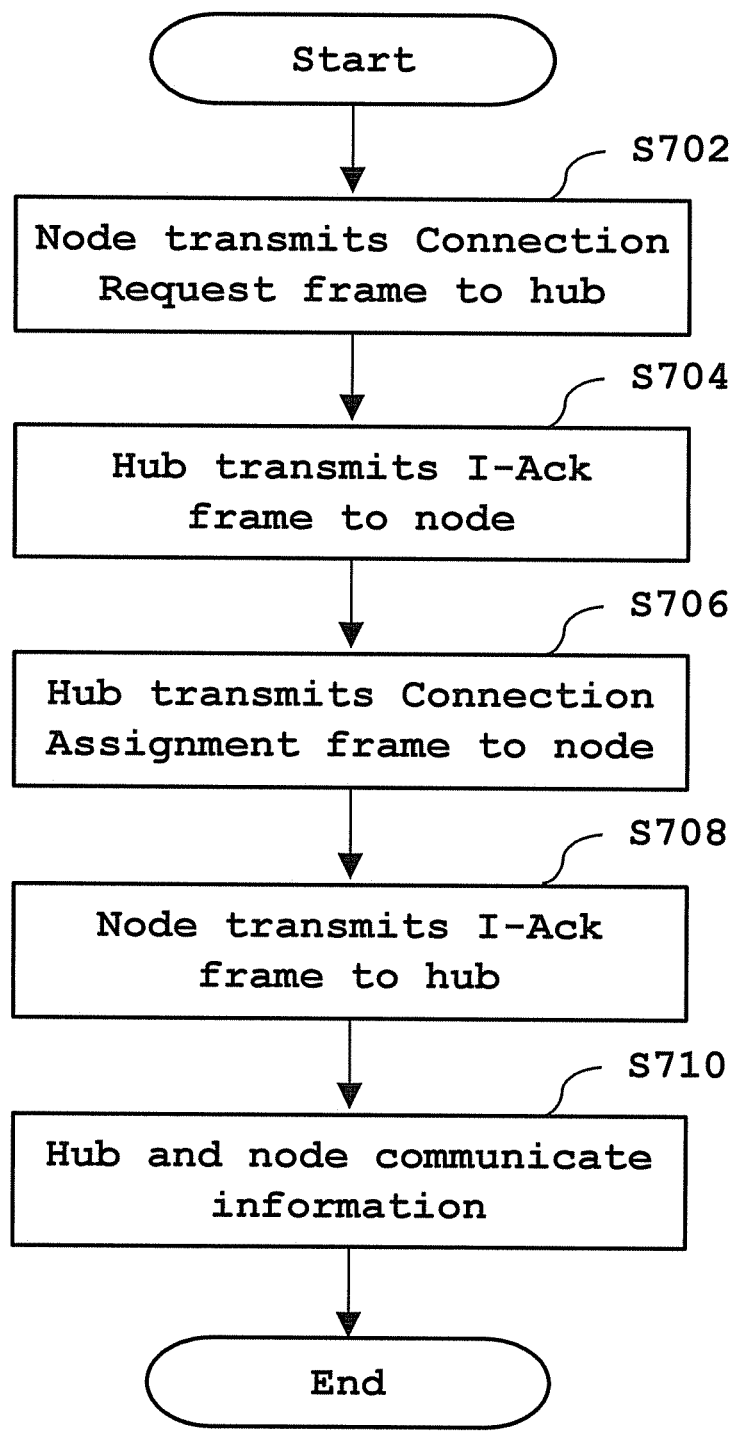
FIG. 7 is a flow chart showing a non-anonymous communication process.

If the hub H receives the Connection Request frame from the node N, the hub H analyses the received Connection Request frame and determines whether or not the node N wants to communicate anonymously (Step S830). This determination is based on the discrimination information contained in the Connection Request frame. In the present embodiment, the hub H determines whether or not the Security Level field of the Frame Control field of the MAC header of the Connection Request frame received from the node N is set to 0b11. In the case that the Security Level field is set to 0b11, the anonymous communication process proceeds. In the case that the Security Level field is not set to 0b11, the conventional non-anonymous communication process proceeds as shown in FIG. 7. As described above, the discrimination information for indicating the anonymous communication process may be stored in a field other than the Security Level field (for example, the Reserved field of the MAC header or the payload).

Then, the hub H transmits an I-Ack frame to the node N to acknowledge the successful receipt of the Connection Request frame (Step S832). In the present embodiment, the Security Level field of the Frame Control field of the MAC header of the I-Ack frame is set to 0b11 as discrimination information of the anonymous communication process. Similarly as above, the discrimination information for indicating the anonymous communication process may be stored in a field other than the Security Level field (for example, the Reserved field of the MAC header) or no discrimination information may be used.

Then, the hub H transmits to the node N a Connection Assignment frame in which the recipient address is set to the substitute address (Step S834). In a similar manner as above, as discrimination information for indicating the anonymous communication process, the Security Level field of the Frame Control field of the MAC header of the Connection Assignment frame is set to 0b11, in the present embodiment. As described above, the discrimination information for indicating the anonymous communication process may be stored in a field other than the Security Level field (for example, the Reserved field of the MAC header) or no discrimination information may be used.

If the node N receives the Connection Assignment frame, the node N transmits an I-Ack frame to the hub H to acknowledge the successful receipt (Step S836). In a similar manner as above, as discrimination information for indicating the anonymous communication process, the Security Level field of the Frame Control field of the MAC header of the I-Ack frame is set to 0b11, in the present embodiment. As described above, the discrimination information for indicating the anonymous communication process may be stored in a field other than the Security Level field (for example, the Reserved field of the MAC header) or no discrimination information may be used. In other embodiments, the anonymous communication process does not include transmitting the I-Ack frame at Step S832 and/or Step S836.

In the case that a connection is established between the hub H and the node N by the procedure described above, the hub H and the node N communicate information (data) with each other until the connection is released (Step S838).

According to the embodiment shown in FIG. 8B, the hub H is informed that the node N communicates using the substitute address. Thus, the hub H can selectively exchange information with the node N. For example, the hub H does not transmit information of high importance to the node N during the anonymous communication process.

As described above, the anonymous communication process is useful, particularly when the node N acquires information of low importance. On the other hand, in the case that the node N determines that it is required to acquire more detailed information, i.e. information of high importance, during the anonymous communication process, the node N can stop the anonymous communication process and switch to the conventional communication process in which the node N lets the hub H know its real address. In the following, a method for switching communication modes according to an embodiment of the invention will be described referring to the algorithm shown in the flow chart of FIG. 10.

Figure 10:
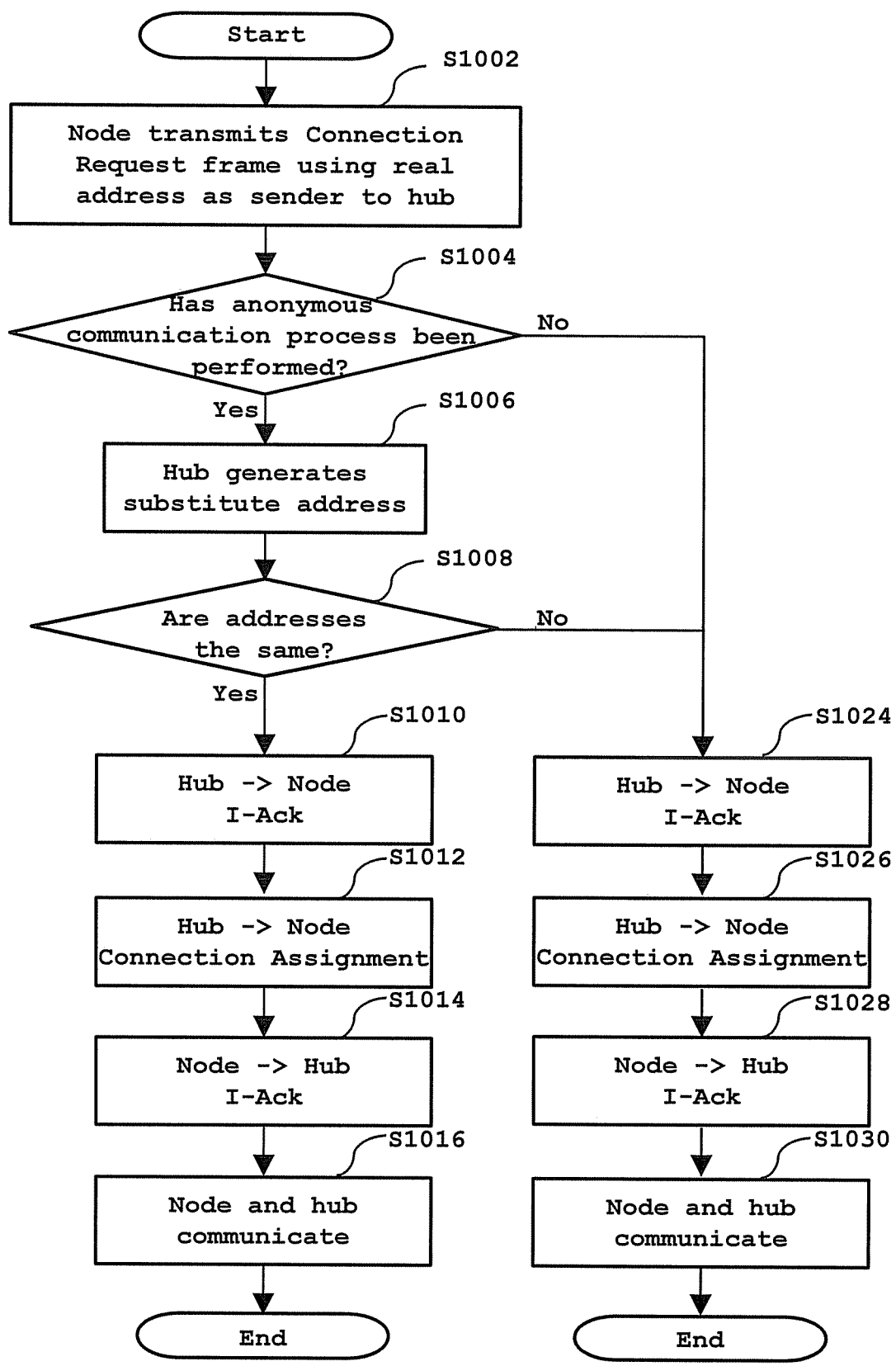
FIG. 10 is a flow chart showing an algorithm for implementing a method for switching communication modes according to an embodiment of the invention.

As shown in FIG. 10, the node N transmits a Connection Request frame in which the Sender Address field is set to its real address to the hub H (Step S1002). If the hub H receives the Connection Request frame, the hub H determines whether or not the anonymous communication process has been performed (Step S1004). More specifically, in the case that the hub H is the communication device 200 shown in FIG. 2, the hub H can determine whether or not the anonymous communication process has been performed by checking whether or not data of a frame stored in the memory 208 includes the discrimination information.

In the case that it is determined at Step S1004 that the anonymous communication process has not been performed (Step S1004: No), the flow proceeds to Step S1024 and the conventional non-anonymous communication process is performed. Since Steps S1024 to S1030 are identical to Steps S704 to S710, detailed explanation on Steps S1024 to S1030 is omitted.

In the case that it is determined at Step S1004 that the anonymous communication process has been performed (Step S1004: Yes), the hub H generates the substitute address, for example, by the method shown in FIG. 9A or 9B using the sender address of the Connection Request frame received from the node N, or, the sender address and the BAN ID (Step S1006). Further, the hub H acquires, from the frame data including the discrimination information stored in the memory 208, the address (i.e. the substitute address) of a node which transmitted the frame. The hub H compares the substitute address generated at Step S1006 with the acquired address, i.e. the substitute address used in the previous anonymous communication process to determine whether or not the two addresses are the same (Step S1008).

In the case that the two addresses are not the same (Step S1008: No), the hub H determines that the Connection Request frame was received from a node which have not communicated with the hub H anonymously. Then, the flow proceeds to Step S1024 and the conventional non-anonymous communication process is performed (Steps S1024 to S1030).

In the case that the two addresses are the same (Step S1008: Yes), the hub H determines that a node which have performed the anonymous communication process starts the non-anonymous communication process and updates connection with the node. Then, the hub H transmits an I-Ack frame to the node N (Step S1010).

The hub H transmits a Connection Assignment frame to the node N (Step S1012). The Recipient Address field of the Connection Assignment frame is set to the real address of the node N which is the recipient of the frame. If the node N receives the Connection Assignment frame, the node N transmits an I-Ack frame to the hub H (Step S1014). In the case that a connection is established between the hub H and the node N by the procedure described above, the hub H and the node N communicate information (data) with each other until the connection is released (Step S1016). In this case, it is desirable that the node N and the hub H do not communicate data which was previously communicated in the anonymous communication process.

Second Embodiment

Figure 11A:
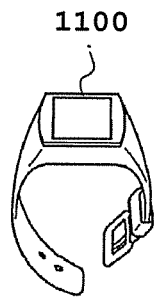
FIG. 11A shows an exterior view of a timepiece type device according to an embodiment of the invention.
Figure 11B:
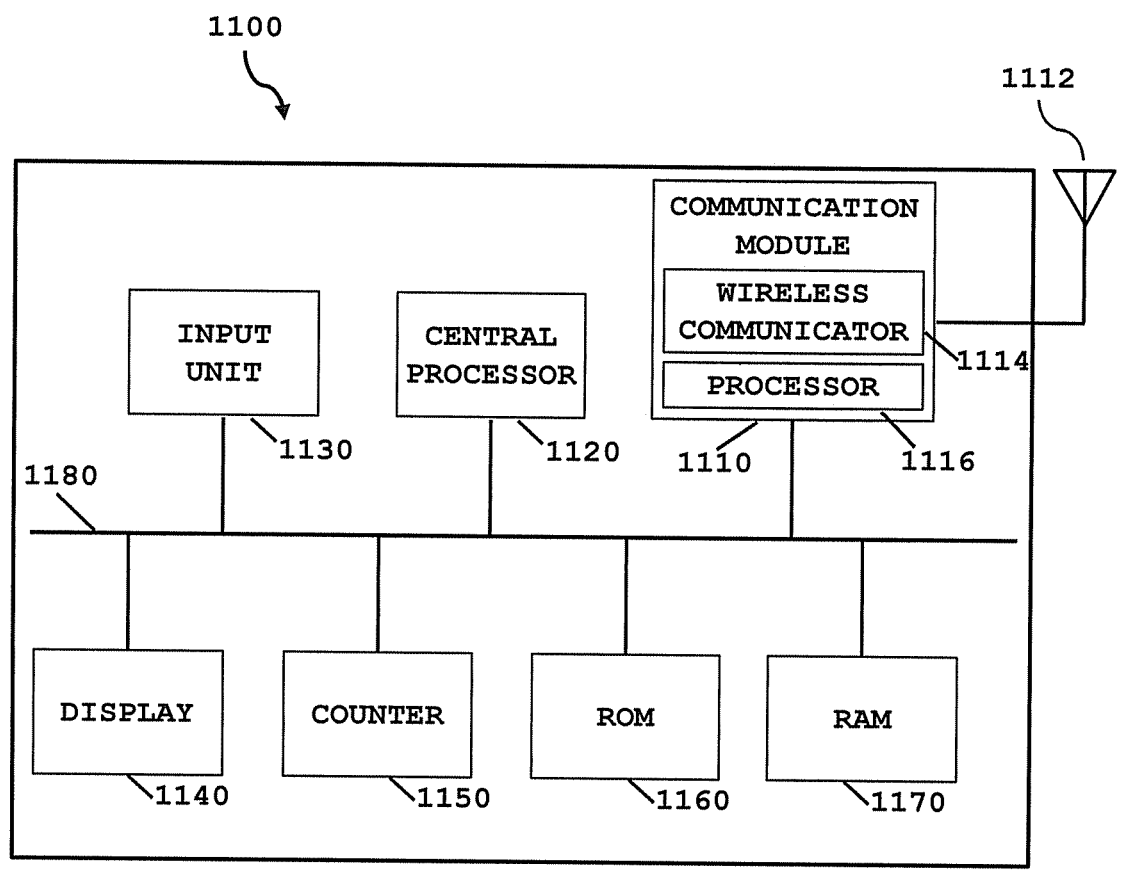
FIG. 11B is a block diagram showing a hardware configuration of the timepiece type device according to the embodiment of the invention.

FIGS. 11A and 11B show an embodiment of a device capable of functioning as the hub or the node in the BAN. FIG. 11A shows an exterior view of the device and FIG. 11B is a block diagram showing a hardware configuration of the device. In the present embodiment, the device is an electronic timepiece. As shown in FIG. 11B, an electronic timepiece 1100 includes a communication module 1110, and the communication module 1110 includes an antenna 1112, a wireless communicator 1114, and a processor 1116. The processor 1116 processes messages exchanged via the antenna 1112 and the wireless communicator 1114 and/or via a wireline connected to the Internet or a different body area network (not shown in the drawing). The processor 1116 may include software, firmware, or hardware. Since the configurations and functions of the antenna 1112, the communicator 1114, and the processor 1116 are the same as those of the antenna 202, the wireless communicator 204, and the processor 206 as described with respect to FIG. 2, more detailed explanation on them is omitted. Further, the communication module 1110 may include a memory (not shown in the drawing) for storing frame data exchanged with other device(s), data such as the frame structure information, the medium access control information and the power management information, computer program instructions, software and/or firmware executed by the processor 1116, or the like.

A central processor 1120 includes a processing unit such as a CPU (Central Processing Unit) and controls operations of the timepiece 1100. For example, the central processor 1120 executes various processes according to programs recorded on a ROM 1160. The configurations and functions of the processor 206 described with respect to FIG. 2 can be realized by the central processor 1120 or cooperation of the central processor 1120 and the processor 1116.

An input unit 1130 includes a plurality of buttons (here, the buttons may be realized by hardware and/or software) having a function of inputting various information and instructions to the timepiece 1100. If a user manipulates the buttons, the input unit 1130 outputs instructions corresponding to the manipulated buttons to the central processor 1120. The central processor 1120 controls each unit to execute a predetermined operation according to the instructions input from the input unit 1130.

A display 1140 displays various kinds of information such as time or a message received from the outside according to an instruction from the central processor 1120.

A counter 1150 generates time signals from signals generated by a system clock or an oscillator and outputs current time.

The ROM 1160 is used to store control programs executed by the central processor 1120 and the like. Further, the ROM 1160 may be used to store computer program instructions, software and/or firmware executed by the processor 1116.

A RAM 1170 provides a work area when the central processor 1120 executes various processes and is used to store data processed by each unit of the timepiece 1100. The RAM 1170 may be used to store data such as the frame structure information, the medium access control information, and the power management information, as well as the frame data transmitted or received.

The timepiece 1100 can be connected to other device. The other device includes a sensor used to monitor data from the body such as body temperature, respiration, heart rate, or blood sugar, or a device for providing a function of controlling a pace maker, a respirator, an insulin pump, or the like, for example.

The present invention has been described with respect to specific embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark). A Bluetooth or Wi-Fi network has a range longer than that of the BAN. Thus, if the present invention is applied to the Bluetooth or the Wi-Fi, anonymous communication can be achieved between devices away from the body region. For example, when a user possessing a device such as a mobile phone or a smart watch approaches a specific location (for example, a restaurant), the user can receive only general (i.e. non-specific to users) information relating to the specific location (for example, a coupon, discount information, etc.) anonymously. By this, it is possible to acquire various kinds of information without exposing the address of the device which is personal information of the user.

As an embodiment, the present invention can be applied to Bluetooth communication. A node serving as a slave generates a substitute address using its unique address BD_ADDR (Bluetooth device address). Further, it is also possible to generate the substitute address by using the BD_ADDR which is the address of the node and BD_ADDR of a master which is a parameter common in the network after connection, as described with respect to FIG. 9B. Discrimination information for indicating that the substitute address is used can be contained in the Reserved field of the Header of a Link Layer packet, for example.

The processes described above can be executed by hardware or software. In the case that a specific process is executed by software, a program configuring the software is installed in the communication device serving as the hub or the node from a network or a storage medium. A recording medium for recording such a program thereon includes a removable media which is distributed separately from the device's main body to provide it to users or a recording medium or the like which is provided to users in a state of being incorporated in the device's main body in advance.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device for communication according to a specific communication protocol defining frames of communication data comprising:
a communicator;
a memory; and
a processor for analyzing frames which the communicator receives and generating frames which the communicator transmits,
wherein the processor acquires first identification information from a connection request frame for requesting a communication connection from an other device received by the communicator, and the first identification information is information for identifying the other device,
the processor determines whether a communication process employing substitute identification information has been performed or not when the first identification information is acquired from the other device, by determining whether or not frame data of a frame including distinguishing information for indicating that the substitute identification information, which has been generated by a sender of the frame for temporary use and is different from unique identification information assigned to the sender of the frame, has been contained in the frame is stored in the memory,
in a case that a determination is made by the processor that frame data including the distinguishing information is stored in the memory and the communication process employing the substitute identification information has been performed, the processor generates second identification information different from the first identification information acquired from the connection request frame received by the communicator based on the first identification information and network identification information which is identification information unique to a network to which the device belongs, and
the processor reads out device identification information from the memory, the device identification information being contained in the frame data including the distinguishing information stored in the memory, compares the read-out device identification information and the second identification information generated based on the first identification information and the network identification information, and generates a frame including the first identification information acquired from the connection request frame received by the communicator in the case that the read-out device identification information and the generated second identification information are the same.

2. The device of claim 1, wherein the frame generated by the processor includes data except for data communicated with the other device using the acquired device identification information.

3. A communication method performed by a device capable of communication according to a specific communication protocol defining frames of communication data comprising:
acquiring first identification information from a connection request frame for requesting a communication connection received from an other device, the first identification information being information for identifying the other device;
determining whether a communication process employing substitute identification information has been performed or not when the first identification information is acquired from the other device, by determining whether or not frame data of a frame including distinguishing information for indicating that the substitute identification information, which has been generated by a sender of the frame for temporary use and is different from unique identification information assigned to the sender of the frame, has been contained in the frame is stored in a memory of the device;

in a case that frame data including the distinguishing information is stored in the memory and the communication process employing the substitute identification information has been performed, generating second identification information different from the first identification information acquired from the connection request frame based on the first identification information and network identification information which is identification information unique to a network to which the device belongs;

reading out device identification information from the memory, the device identification information being contained in the frame data including the distinguishing information stored in the memory;

comparing the device identification information read out from the memory and the second identification information generated based on the first identification information and the network identification information; and generating a frame including the first identification information acquired from the connection request frame in the case that the device identification information acquired from the memory and the generated second identification information are the same.

4. A non-transitory computer-readable recording medium for recording a computer program controlling a device capable of communication according to a specific communication protocol, the program causing the device to perform steps of:

acquiring first identification information from a connection request frame for requesting a communication connection received from an other device, the first identification information being information for identifying the other device;

determining whether a communication process employing substitute identification information has been performed or not when the first identification information is acquired from the other device, by determining whether or not frame data of a frame including distinguishing information for indicating that the substitute identification information, which has been generated by a sender of the frame for temporary use and is different from unique identification information assigned to the sender of the frame, has been contained in the frame is stored in a memory of the device;

in the case that frame data including the distinguishing information is stored in the memory and the communication process employing the substitution identification information has been performed, generating second identification information different from the first identification information acquired from the connection request frame based on the first identification information and network identification information which is identification information unique to a network to which the device belongs;

reading out device identification information from the memory, the device identification information being contained in the frame data including the distinguishing information stored in the memory;

comparing the device identification information read out from the memory and the second identification information generated based on the first identification information and the network identification information; and generating a frame including the first identification information acquired from the connection request frame in the case that the device identification information read out from the memory and the generated second identification information are the same.

* * * * *